(No Model.)

J. B. LAURENT.
GAS STOVE.

No. 544,275. Patented Aug. 6, 1895.

WITNESSES:
Donn Twitchell
M. W. Fairbrother

INVENTOR
Joseph B. Laurent
BY Alvin K. Goodwin
ATTORNEY

UNITED STATES PATENT OFFICE.

JOSEPH BENJAMIN LAURENT, OF NEW YORK, N. Y.

GAS-STOVE.

SPECIFICATION forming part of Letters Patent No. 544,275, dated August 6, 1895.

Application filed August 11, 1894. Renewed July 8, 1895. Serial No. 555,289. (No model.)

*To all whom it may concern:*

Be it known that I, JOSEPH BENJAMIN LAURENT, a citizen of the United States, residing in the city of New York, county and State of New York, have invented certain new and useful Improvements in Gas-Stoves, of which the following is a specification.

My invention relates to gas or fluid fuel stoves useful for broiling, baking, boiling, and general cooking or heating purposes, and has for its more special object to facilitate the cleaning of the lower burner or burners employed for broiling or baking, and without necessitating the breaking of any of the joints or connections of the valved fuel-supply pipes of the stove.

The invention consists, mainly, in a special arrangement of the burner adapted to heat either or both the broiling and baking chambers of the stove and in such relation to the adjacent stove-body wall that the outer side or wall of the burner forms a portion of the outer visible wall of the stove-body, preferably that portion of it located between the broiling and baking chambers of the stove. The burner-body is fitted to the stove-wall next a fixed lug or lugs thereon, to which the gas-supply pipes are connected independently of the burner-body, thereby permitting the burner or the main parts thereof to be removed for quickly and thoroughly cleaning it without disturbing the gas-supply-pipe connections.

In the present preferred adaptation of my invention the burner is made of separable cast-iron parts fitted preferably in a recess of the stove-body located between the doors of the broiling and baking chambers of the stove. Both parts or halves of the burner-body are preferably made removable from the stove-body wall to facilitate cheap manufacture and give greater convenience in cleaning or adjusting the burner, and the outer half or part of the burner-body forms a removable portion of the stove-body wall, but the inner half or wall of the burner-body having the flame-apertures may be cast solidly with the body-wall of the stove, while the outer half of the burner-body forms a visible portion of the stove-body wall, which is detachable, to give free access to the interior of the burner for cleaning it.

The invention will first be described and then will be particularly defined in claims hereinafter set forth.

Reference is to be had to the accompanying drawings, forming part of this specification, and in which similar numerals indicate corresponding parts in the several views.

Figure 1:
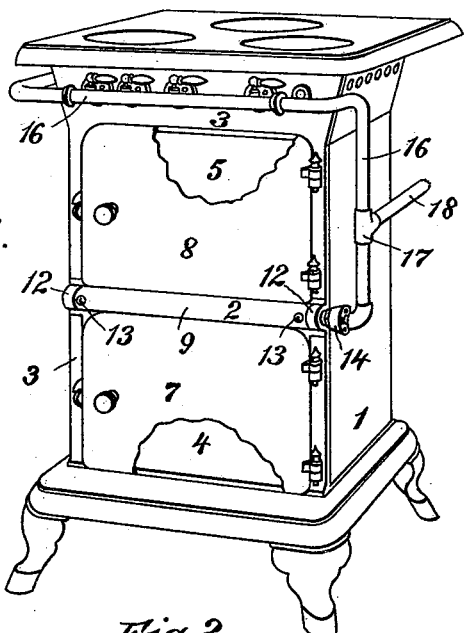
Figure 2:
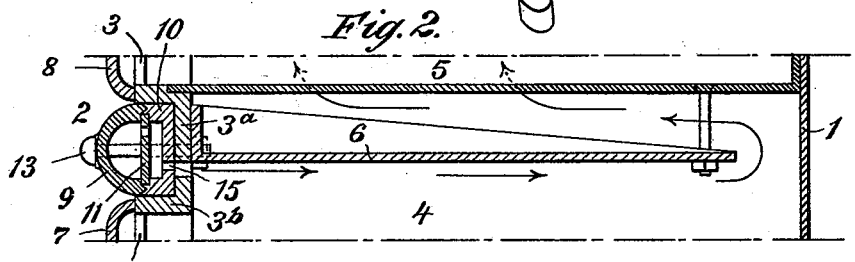
Figure 3:
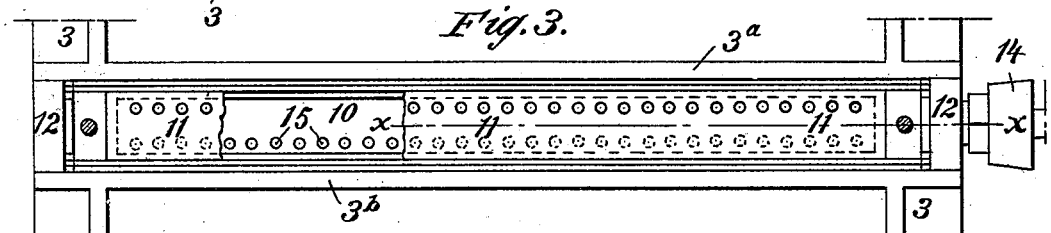
Figure 5:
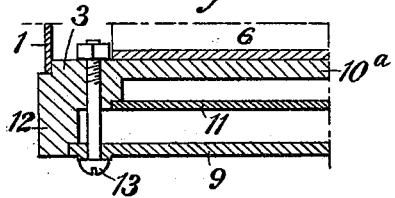
Figure 4:
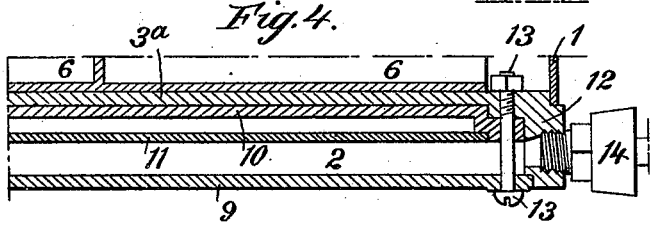

Figure 1 is a front perspective view of a gas-stove embodying my invention and with the doors partly broken away. Fig. 2 is an enlarged central vertical section of that part of the stove next the lower burner. Fig. 3 is an enlarged front view of the parts shown in Fig. 2, the outer plate or portion of the burner-body constituting a detachable portion of the stove-body wall being removed and the burner baffle-plate being partly broken away. Fig. 4 is a sectional plan view taken on the line $x$ $x$ in Fig. 3; and Fig. 5 is a sectional plan view of a modification, hereinafter particularly described.

First referring more particularly to Figs. 1 and 4 of the drawings, the numeral 1 indicates the main stove-body, which has or may have double walls forming flues which carry off the hot products from the lower burner 2 in any approved manner not necessary to fully show or describe. The burner in this instance is located at and along the front wall 3 of the stove-body and projects its flame horizontally rearward to allow broiling or roasting to be done directly at or by the flame and in the lower chamber 4 of the stove, while the hot products of the flame rise in the stove-wall flues to heat the superimposed baking-oven 5. The burner-flame plays along beneath the usual cast-iron guard-plate 6, which is held an inch or two below the bottom of the oven and at its front edge abuts, preferably, against a fixed cross-bar of the front wall of the stove-body and at its side and rear edges falls short of the adjacent stove-body walls to allow rise of the hot products through the flues which heat the oven.

In the stove shown in the drawings the burner has the usual location or at the top and front of the broiling or roasting chamber 4 and between the doors 7 8 of said chamber and baking-oven, respectively.

I prefer to make the burner-body with two separable main parts 9 10, both independently removable from the adjacent wall 3 of the stove. This wall preferably has two angular and separated cross bars or pieces 3ª 3ᵇ together forming a recess at the front of the stove-body and between the broiling-chamber 4 and baking-oven 5 to receive the burner. An interior perforated baffle-plate 11 divides the burner-body into two chambers and prevents "lighting back" in the usual manner.

The outer part 9 of the burner-body normally forms a detachable portion of the adjacent wall of the stove-body, and is preferably made concavo-convex in cross-section. (See Fig. 2 of the drawings.) Said part 9 is fitted at its ends between lugs 12 12, fixed to and preferably cast solidly with the stove-wall 3. I now prefer to use two bolts or screws 13 13, one at each end of the burner-body, to hold the entire burner securely to the stove-wall 3 and permit the outer part 9, with the baffle-plate 11, or all three parts 9 10 11 of the burner to be easily and quickly removed at will for cleaning or adjusting purposes. The burner may be held to the stove-body in any other approved manner. Either one of the stove-body lugs 12 furnishes a means of connection for the outer mixing-tube portion of the burner and its air-chamber 14, containing the usual gas-jet nipple.

The mixture of gas and air entering the burner passes through the perforations of the baffle-plate 11, and thence through the row or series of apertures 15 of the inner plate 10, whence the burner flames rearward between the cross-bars 3ª 3ᵇ of the stove-wall 3 and beneath the oven guard-plate 6 above mentioned, and the hot products also rise past the side edges of said plate to heat the baking-oven 5, all as indicated by the arrows in Fig. 2 of the drawings.

One pipe 16, having suitable valve connections, supplies the gas for the lower burner 9 10 and for the upper series of boiling-burners (not shown) arranged in the usual manner at the grated top of the stove. This pipe 16 has a T-coupling 17, to which the supply-pipe 18 leading from the gas-main is connected when the stove is set up for use.

Fig. 5 of the drawings sufficiently illustrates a modification, in which the rear or inner flame-aperture plate 10ª of the burner-body is cast solidly or in one piece with the stove-body wall 3, and the outer part 9 of the burner-body forms a removable portion of the stove-wall to give free access to the burner. This construction, while being the operative equivalent of that first described, is not as practical, because should either the burner or the stove-body wall 3 be broken both would require renewal to repair the stove; while, with both parts 9 10 of the burner made separable from the stove-wall, either the wall or the burner would alone need renewal should either be broken. Furthermore, it is easier and cheaper to bore the flame-apertures of the burner and closely cement-join its two body portions and to otherwise fit and assemble the parts of the stove when both parts 9 10 of the burner are separable from the comparatively large and heavy wall of the stove-body.

Obviously my invention is adapted for use with stoves of any size—as, for instance, smaller gas-stoves—adapted at the lower part for broiling only, or for baking only, or those having but one cooking-chamber below the usual top boiling-burners, or with stoves adapted for general heating purposes. The invention is, however, more especially adapted to a stove combining broiling, baking, and boiling functions and constituting in itself a complete gas-range.

My improvements may be applied at any one or two or more side walls of a stove-body, as the preferred number or location of the burners may suggest or require.

It will be understood that the drawings represent only a preferred construction in which the burner is made of cast-iron, but important features of the invention, as hereinafter claimed, may be embodied in a gas-stove having one or more burners made of wrought-iron or other material and occupying substantially the position shown, and forming by its outer wall a portion of the visible wall of the stove-body, and adapted for removal in whole or in part for cleaning or adjusting purposes without breaking or disturbing the connections of the gas-supply pipes with the stove.

Having thus described my invention, I claim as new and desire to secure by Letters Patent—

1. A gas stove having a burner made with two main parts, the outer part forming practically a detachable portion of the outer stove body wall which when removed gives access to the interior of the burner; the gas supply pipe being connected independently of the outer detachable portion of the burner, substantially as described.

2. A gas stove having a burner made with two main parts and an intermediate removable baffle plate, the outer main part being practically a detachable portion of the outer stove body wall which when removed gives access to the interior of the burner and to the removable baffle plate; the gas supply pipe being connected independently of the outer removable portion of the burner, substantially as described.

3. A gas stove having a burner made with two main parts, the outer part forming practically a detachable portion of the outer stove body wall, said wall having fixed lugs between which the ends of the detachable burner portion are fitted; the gas supply pipe of the burner being connected at one of said lugs and independently of the outer removable portion of the burner, substantially as described.

4. A gas stove made with a burner having two separable and removable main parts, the outer one forming practically a detachable portion of the outer stove body wall; the gas supply pipe of the burner being connected independently of the removable main portions thereof, substantially as described.

5. A gas stove made with a burner having two separable and removable main parts, the outer one forming practically a detachable portion of the outer stove body wall, and an intermediate removable baffle plate; the gas supply pipe of the burner being connected independently of the removable main portions thereof, substantially as described.

6. A gas stove made with a lower broiling or roasting chamber, an upper oven or baking chamber, a guard plate arranged horizontally below the oven, a burner having two main parts, the outer part forming practically a detachable portion of the outer stove body wall, said burner being adapted to flame inward beneath the oven guard plate, and a gas supply pipe connected independently of the detachable part or parts of the burner, substantially as described.

7. The combination in a gas stove, of a front wall plate having a recess, said plate having lugs 12, to one of which the fuel supply pipe is connected, and a burner comprising body portions 9, 10, and interior baffle plate 11, and fitted in said recess and removable therefrom, substantially as described.

JOSEPH BENJAMIN LAURENT.

Witnesses:
   GEO. THEOD. SOMMER,
   WILLIAM M. CRANE.